United States Patent

[11] 3,619,266

[72] Inventors: Klaus Weissermel, Kelkheim/Taunus; Rudolf Kern, Mainz; Heinz Schmidt, Frankfurt am Main; Walter Herwig, Frankfurt am Main, all of Germany
[21] Appl. No.: 817,550
[22] Filed: Apr. 18, 1969
[45] Patented: Nov. 9, 1971
[73] Assignee: Farbwerke Hoechst Aktiengesellschaft vormals Meister Lucius & Bruning Frankfurt am Main, Germany
[32] Priority: Dec. 12, 1968
[33] Germany
[31] P 18 14 148.5

[54] THERMOPLASTIC MOULDING COMPOSITIONS ON THE BASIS OF SATURATED POLYESTERS
15 Claims, No Drawings

[52] U.S. Cl. ............................................ 117/100 C, 117/138.8 F, 117/168
[51] Int. Cl. .................................................. B32b 27/06, B32b 27/36
[50] Field of Search ....................................... 117/100 C, 168, 138.8 F, 121; 260/37 EP, 835, 28

[56] References Cited

UNITED STATES PATENTS

| | | | |
|---|---|---|---|
| 2,779,745 | 1/1957 | Howland | 117/100 X |
| 2,962,469 | 11/1960 | Phillips et al. | 260/835 |
| 3,180,750 | 4/1965 | Shipee et al. | 260/28 |
| 3,193,601 | 7/1965 | Billingsley | 264/142 |
| 3,245,817 | 4/1966 | Lovness | 117/168 |
| 3,405,102 | 10/1968 | Kugler et al. | 260/37 |
| 3,461,088 | 8/1969 | Stahnecker et al. | 117/100 |
| 3,461,092 | 8/1969 | Sory | 117/100 |

FOREIGN PATENTS

| | | | |
|---|---|---|---|
| 847,059 | 9/1960 | Great Britain | 117/100 |

*Primary Examiner*—William D. Martin
*Assistant Examiner*—Mathew R. P. Perrone, Jr.
*Attorney*—Curtis, Morris and Safford

ABSTRACT: Thermoplastic moulding compositions on the basis of linear saturated polyesters wherein the polyester granules containing a neutral or partially neutralized salt of montan wax or of montan wax esters is additionally coated with a neutral or partially neutralized salt of montan wax or of montan wax esters.

THERMOPLASTIC MOULDING COMPOSITIONS ON THE BASIS OF SATURATED POLYESTERS

The present invention relates to thermoplastic moulding compositions on the basis of saturated polyesters, which moulding compositions have improved properties.

It has been proposed to produce shaped articles from thermoplastic moulding compositions comprising saturated linear polyesters of aromatic dicarboxylic acids. It has also been proposed to add to polyethylene terephthalate finely divided inorganic substances as nucleating agents to increase the speed of crystallization of the injection moulded polyester in the mould. By this step the crystallinity and the density of the injection moulded articles are increased and therewith the dimensional stability and stability of shape at elevated temperature are improved. As solid inorganic substances there have been proposed, for example, metal oxides, alkaline earth metal salts, talc powder, glass powder, or metals. The inorganic substances should have a particle size of less than 2 microns.

It has likewise been proposed further to increase the speed of crystallization by adding to the polyesters a mixture of the inorganic nucleating agents with specific epoxides.

In copending Application ..... Ser. No. 817,545 filed concurrently herewith a process for the manufacture of rapidly crystallizing moulding compositions on the basis of saturated linear polyesters is described in which the polyester mixed with inert inorganic solids and specific epoxides is coated, after the usual after-condensation, with a salt of a montan wax or of a montan wax ester.

By the addition of montan wax salts or salts of montan wax esters to the polyester composition containing inorganic nucleating agents and specific epoxides, the injection cycle can be considerably shortened and therewith the rate of production increased without the utilitarian properties of the polyester being detrimentally affected.

Further experiments have revealed that the aforesaid process can be further simplified.

It has now been found that thermoplastic moulding compositions on the basis of saturated linear polyesters and having advantageous properties can be produced by coating polyester granules containing 0.05 to 1.5 percent by weight, preferably 0.1 to 1 percent by weight, and more preferably 0.15 to 0.6 percent by weight, calculated on the polyester, of neutral or partially neutralized salts of montan wax or of montan wax esters, optionally together with other known additives, which polyester granules have a reduced specific viscosity of at least 1.25 dl./g., measured with a 1 percent solution in a 60:40 mixture of phenol and tetrachloroethane at 25 ° C., and a moisture content of less than 0.01 percent by weight, with 0.01 to 1 percent by weight, preferably 0.05 to 0.5 percent by weight, and more preferably 0.1 to 0.4 percent by weight, calculated on the polyester, of neutral or partially neutralized salts of montan wax or of esters of montan wax.

As compared with the process proposed in our copending application referred to above, the present process offers various advantages.

Montanates are better compatible with the polyester than the inorganic solids. As the salts of montan wax melt during processing, they are more finely divided in the polyester and more effective than the inorganic solids. Moreover, the formation of agglomerates, which may occur with the sole addition of inorganic solids and cause flaws whereby the impact strength of the moulded articles is reduced, is not observed.

As polyester polyethylene terephthalate is used in the first place. Other suitable polyesters are, for example, poly-cyclohexane-1, 4-dimethylol terephthalate or polyesters containing as acid component, in addition to terephthalic acid, up to 5 mole percent of other aromatic or aliphatic dicarboxylic acids, such as isophthalic acid, naphthalene-2, 6 -dicarboxylic acid or adipic acid, or as alcoholic component, in addition to ethylene glycol, up to 30 mole percent of other aliphatic diols, such as 2, 2-dimethylpropane-diol-(1, 3) or butane-diol-(1, 4), or up to 1 percent of tetrols, for example 1,1,4,4-tetramethylolcyclohexane. Polyesters of hydroxy-carboxylic acids may also be used. The polyesters should have a reduced specific viscosity of from 0.6 to 2.0 dl./g., preferably 0.9 to 1.6 dl./g., measured with a 1 percent polymer solution in a 60:40 mixture of phenol and tetrachloroethane at 25° C. Especially good results are obtained with polyesters having a reduced specific viscosity of from 1.1 to 1.5 dl./g. Prior to coating with the salts of montan wax or esters of montan wax the polyesters should have a reduced specific viscosity of at least 1.25 dl./g. If necessary, this value can be reached by subjecting the polyester to an after-condensation.

Montan acid is an acid mixture essentially consisting of aliphatic monocarboxylic acids having 26 to 32 carbon atoms in the chain. Suitable salts of montan wax contain as cation metals of main groups I–III of the Periodic System, preferably Li, Na, K, Be, mg. Ca, and Al, sodium montanates being preferred. As partially neutralized salts of montan wax there are used salts obtained by reacting montan acid with 0.1 to 1 equivalent of alkali metal hydroxide or alkali metal oxide, preferably salts obtained with 0.25 to 0.9 equivalent of sodium hydroxide.

Salts of montan wax esters that can be used are obtained by partial esterification of montan acids with up to 0.90 equivalent, preferably 0.5 to 0.8 equivalent of dihydric alcohols having 2 to 4 carbon atoms in the alkylene group, with subsequent neutralization with oxides or hydroxides of the metals specified above. Especially suitable diols are, for example, ethylene glycol, 1, 2-propane-diol, 1, 3-propane-diol, 1, 3-butane-diol and 1, 4 -butane-diol.

The salts of montan wax or of esters of montan wax acting as nucleating agents can be added to the finished polyester granules or during the manufacture of the polyester prior to or during polycondensation. Optionally, other known additives may also be added. The coated granules are homogenized, for example in an extruder, and then granulated again.

Known additives are, for example inorganic nucleating agents, such as alkaline earth metal carbonates, for example calcium magnesium carbonate, and oxides such as titanium oxide or aluminum oxide, as well as talc and aluminum silicates, preferably sodium-aluminum silicate.

The inorganic nucleating agents are added to the polyester in an amount in the range of from 0 to 2 percent by weight, preferably 0 to 0.6 percent by weight, calculated on the polyester.

Further known additives are polyfunctional epoxides of the general formula

in which R, $R_1$, $R_2$ and $R_3$ stand for hydrogen, alkyl, cycloalkyl, aryl or aralkyl groups, which may be linked to one another with formation of ring structures and may contain ether or ester groupings. In general, the specified epoxides are added also in an amount in the range of from 0 to 2 percent by weight, preferably 0 to 0.3 percent by weight, calculated on the polyester. Suitable polyfunctional epoxides are, for example, alkylene-polyol-glycidyl ethers or butanediol-(1, 4) diglycidyl ether.

By coating the polyester granules with a salt of a montan wax or a montan wax ester there is obtained not only a rapid crystallization of the moulded article in the mould and better mould release properties, but simultaneously the granules are protected against the absorption of moisture. To obtain unobjectionable injection moulded articles the polyester moulding composition should contain as little moisture as possible, preferably less than 0.01 percent by weight.

In order to bring about crystallization in the mould the mould must be maintained at a temperature of at least 110° C. A rapid crystallization and therewith short injection cycles are obtained with mould temperatures in the range of from 120 ° to 150 °C., preferably of from 135° to 154° C.

Tests were carried out using the injection mould for a program control dial of a washing machine wherein the dial was pressed out of the mould by very sharp ejector pins. The injection cycle was defined after which the ejector pins did just not penetrate into the finished moulded articles and the article fell from the mould almost by itself.

The following examples serve to illustrate the invention but they are not intended to limit it thereto, the percentages are percent by weight, calculated on the polyethylene terephthalate.

EXAMPLE 1

Granules of polyethylene terephthalate having a moisture content below 0.01 percent and a reduced specific viscosity of 1.40 dl./g. were rolled for 1 hour with 0.4 percent of sodium montanate. The coated granules were homogenized in an extruder at a temperature of 275° C., the melt was extruded into water in the form of a wire and granulated. Next, the granules were dried until the moisture content had dropped below 0.01 percent and the reduced specific viscosity was raised to 1.40 dl./g. by heating the granules for 7–8 hours at 240° C. under a pressure of 0.4 mm. of mercury. Finally, the granules were coated with 0.2 percent of sodium montanate.

With the granules obtained program control dials having a diameter of 10 cm. were injection moulded at a cylinder temperature of 265° C. and a temperature of the mould of 140° C. The total injection cycle was 60 seconds. The residence time in the mould was chosen in such a manner that the ejector pins did no longer penetrate into the moulded articles when the mould was opened. The moulded articles had excellent surface properties were free from flashes and had a density of 1.370 g./cc.

The impact strength of the injection moulded articles was determined with the drop hammer tester in the manner described below. The height at which 50 percent of the samples broke was 2.00 meters.

Drop hammer tester:

A sheet of 70×70×4 mm. is pneumatically clamped on a table and the dropping hammer (1 kg) is suspended on a stop device with which it is ascended to the desired height. The dropping hammer is released pneumatically and hits the sample in the center of the clamping ring. When the samples is not punched the dropping hammer is held by a pneumatically operated receiver when it jumps back. 10 Sheets are tested for each height and the height is determined at which 50 percent of the sheets break = 50 percent breaking limit.

COMPARATIVE EXAMPLE 1

Granules of polyethylene terephthalate having a moisture content of less than 0.01 percent and a reduced specific viscosity of 1.40 dl./g. measured with a 1 percent solution in a 60:40 mixture of phenol and tetrachloroethane at 25° C., were rolled for 1 hour together with 0.6 percent of sodium montanate. The coated granules were homogenized in an extruder at a temperature of 275° C., the melt was extruded in wire form into water and granulated. The moisture content of the granules was again reduced to a value below 0.01 percent by weight and the reduced specific viscosity was raised to 1.4 dl./g. by heating the granules for 6 to 8 hours at 240° C. under a pressure of 0.4 mm. of mercury.

With the granules program control dials having a diameter of about 10 cm. were injection moulded at a cylinder temperature of 265° C. and a temperature of the mould of 140° C. The total injection cycle lasted for more than 90 seconds. Even with the long residence time in the mould the ejector pins penetrated considerably into the moulded article which was tacky and difficult to remove from the mould. The injection moulded articles were strongly distorted. The density was found to be 1.370 g./cc.

EXAMPLE 2

Granules of polyethylene terephthalate having a moisture content of less than 0.01 percent and a reduced specific viscosity of 1.40 dl./g. were rolled for 1 hour together with 0.2 percent of sodium-aluminum silicate and 0.2 percent of sodium montanate. The coated granules were homogenized in an extruder at 275° C., the melt was extruded into water in the form of a wire and granulated. The granules were then dried until the moisture content had dropped below 0.01 percent and heated for 7 to 8 hours until the reduced specific viscosity was 1.4 dl./g. Finally, the granules were coated with 0.2 percent of sodium montanate.

With the granules obtained program control dials having a diameter of 10 cm were injection moulded at a cylinder temperature of 265° C. and a temperature of the mould of 140° C. The total injection cycle was 75 seconds. The residence time in the mould was chosen in such a manner that the ejector pins did not penetrate into the articles when the mould was opened. The moulded articles had excellent surface properties, were free from flashes and had a density of 1.370 g./cc.

In the drop hammer test the 50 percent breaking limit was 2.00 m.

EXAMPLE 3

Granules of polyethylene terephthalate having a moisture content of less than 0.01 percent and a reduced specific viscosity of 1.40 dl./g. were rolled for 1 hour together with 0.4 percent of montan acid partially neutralized with 0.80 equivalent NaOH. The coated granules were homogenized in an extruder at a temperature of 275° C., the melt was extruded into water in the form of a wire and granulated.

The granules were then dried until the moisture content had dropped below 0.01 percent and the reduced specific viscosity was raised to 1.4 dl./g. by heating the granules for 7 to 8 hours at 240° C. under a pressure of 0.4 mm. of mercury. Finally the granules were coated with 0.3 percent of montan acid which had been partially neutralized with 0.80 equivalent NaOH.

With the granules program control dials having a diameter of 10 cm. were injection moulded at a cylinder temperature of 265° C. and a temperature of the mould of 140° C. The total injection cycle was 80 seconds. The residence time in the mould was chosen in such a manner that the ejector pins did no longer penetrate into the articles when the mould was opened. The injection moulded articles had excellent surface properties, they were free from flashes and had a density of 1.369 g./cc.

In the drop hammer test the height at which 50 percent of the sheets broke was 1.80 m.

EXAMPLE 4

Granules of polyethylene terephthalate having a moisture content of less than 0.01 percent and a reduced specific viscosity of 1.40 dl./g. were rolled for 1 hour together with 0.2 percent of butane-diol-1,4-diglycidyl ether and 0.5 percent of a montan acid partially neutralized with 0.70 equivalent NaOH and partially esterified with 0.30 equivalent ethylene glycol. The coated granules were homogenized in an extruder at a temperature of 275° C., the melt was extruded into water in the form of a wire and granulated. The granules were than dried until the moisture content had dropped below 0.01 percent and the specific viscosity was raised to 1.40 dl./g. by heating the granules for 7 to 8 hours at 240° C. under a pressure of 0.4 mm. of mercury. The granules were then coated with 0.2 percent of montan acid which had been partially neutralized with 0.70 equivalent NaOH and partially esterified with 0.30 equivalent ethylene glycol.

With the granules program control dials having a diameter of 10 cm. were injection moulded at a cylinder temperature of 265° C. and a temperature of the mould of 140° C. The total injection cycle was 75 seconds. The residence time in the mould was chosen in such a manner that the ejector pins did no longer penetrate into the articles when the mould was opened. The injection moulded articles had excellent surface properties, they were free from flashes and had a density of 1.370 g./cc.

We claim:

1. A composition consisting essentially of granules of a saturated linear polyester of terephthalic acid and a saturated aliphatic or cycloaliphatic diol containing 0.05 to 1.5 percent by weight, calculated on the weight of the polyester, of a neutral or partially neutralized salt of montan wax or montan wax ester, said granules having a reduced specific viscosity of at least 1.25 dl./g. measured in a 1 percent solution in a 60:40 mixture of phenol and tetrachlorethane at 25° C., and having a moisture content of less than 0.01 percent by weight, said granules being coated with 0.01 to 1 percent by weight, calculated on the weight of the polyester, of a neutral or partially neutralized salt of montan wax or montan wax ester.

2. The composition of claim 1, wherein the polyester granules contain other additives in addition to the neutral or partially neutralized salt of montan wax or of montan wax ester.

3. The composition of claim 1, wherein the saturated linear polyester is polyethylene terephthalate.

4. The composition of claim 1, wherein the saturated linear polyester is polycyclohexane-1,4-dimethylol terephthalate.

5. The composition of claim 3, wherein the linear saturated polyester contains as acid component, in addition to terephthalic acid, up to 5 mole percent of another aromatic or aliphatic dicarboxylic acid.

6. The composition of claim 3, wherein the polyester contains as diol component, in addition to ethylene glycol, up to 30 mole percent of another aliphatic diol.

7. The composition of claim 5, wherein the polyester contains as acid component a hydroxycarboxylic acid.

8. The composition of claim 1, wherein a neutral or partially neutralized salt of a metal of main groups I to III of the Periodic Table is used.

9. The composition of claim 8, wherein the salt is sodium montanate.

10. The composition of claim 1, wherein the salt of montan acid neutralized with 0.1 to 1 equivalent of alkali metal hydroxide or oxide is used.

11. The composition of claim 2, wherein the additives are inorganic nucleating agents selected from the group consisting of alkaline earth metal carbonates, titanium dioxide, aluminum oxide, talc, aluminum silicates and sodium-aluminum silicate.

12. The composition of claim 11, wherein the inorganic nucleating agent is added in an amount of up to 2 percent by weight, calculated on the weight of the polyester.

13. The composition of claim 2, wherein the additive is a polyfunctional epoxide of the general formula

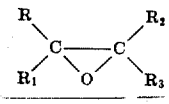

in which R, $R_1$, $R_2$, and $R_3$ stand for hydrogen, alkyl, cycloalkyl, aryl or aralkyl groups which may be linked with one another with formation of ring structures and may contain ether or ester groupings.

14. The composition of claim 13, wherein the polyfunctional epoxide is selected from the group consisting of alkylene-polyol glycidyl ethers and butane-diol-1,4-diglycidyl ether.

15. The composition of claim 13, wherein the epoxide is added in an amount of up to 2 percent by weight, calculated on the weight of the polyester.

* * * * *